United States Patent [19]

Le Blanc

[11] Patent Number: 5,651,737
[45] Date of Patent: Jul. 29, 1997

[54] DRILL MOTOR COUPLING FOR MISALIGNED ROTATING SHAFTS

[75] Inventor: F. L. Le Blanc, Broussard, La.

[73] Assignee: Drill Motor Services, Inc., Broussard, La.

[21] Appl. No.: 588,289

[22] Filed: Jan. 18, 1996

Related U.S. Application Data

[63] Continuation of Ser. No. 237,068, May 3, 1994, abandoned.

[51] Int. Cl.⁶ .................................................. F16D 3/44
[52] U.S. Cl. ........................................ 464/157; 464/106
[58] Field of Search .................................. 464/106, 157, 464/19, 18

[56] References Cited

U.S. PATENT DOCUMENTS

| | | |
|---|---|---|
| 763,127 | 6/1904 | Tilden. |
| 956,151 | 4/1910 | Nystrom. |
| 2,134,563 | 10/1938 | Koppel ................. 464/157 X |
| 2,217,969 | 10/1940 | Schairer. |
| 2,830,445 | 4/1958 | Kressin. |
| 2,854,829 | 10/1958 | Porter. |
| 2,892,327 | 6/1959 | Kressin. |
| 2,893,222 | 7/1959 | Albedyhl et al. ......... 464/157 X |
| 2,924,955 | 2/1960 | Sharman et al.. |
| 3,059,950 | 10/1962 | Hedges. |
| 3,252,301 | 5/1966 | Herrington, Jr.. |
| 3,325,197 | 6/1967 | Wehner. |
| 3,955,378 | 5/1976 | Allonca ................. 464/106 |
| 4,391,547 | 7/1983 | Jackson, Jr. et al.. |
| 4,840,601 | 6/1989 | Denman. |
| 4,962,818 | 10/1990 | Delucia. |
| 4,976,655 | 12/1990 | Herbert, Sr.. |
| 5,037,354 | 8/1991 | Shaff et al. ........... 464/106 X |
| 5,073,145 | 12/1991 | Ratzokwski et al.. |
| 5,205,789 | 4/1993 | Falgout, Sr.. |

*Primary Examiner*—Daniel P Stodola
*Assistant Examiner*—Emmanuel M. Marcelo
*Attorney, Agent, or Firm*—Pravel, Hewitt, Kimball & Krieger

[57] ABSTRACT

A drill coupling having opposing leg members which matingly engage to transmit rotational load. A pin having an enlarged spherical convex head is laterally inserted between leg members of one element within a recessed region precluding the axial removal of the pin. The other element of the coupling is then inserted down around the pin, engaging the leg members. The pin is secured in place. The first element may pivot with respect to the second element, thereby accommodating misalignments of connecting rotary shafts.

19 Claims, 2 Drawing Sheets

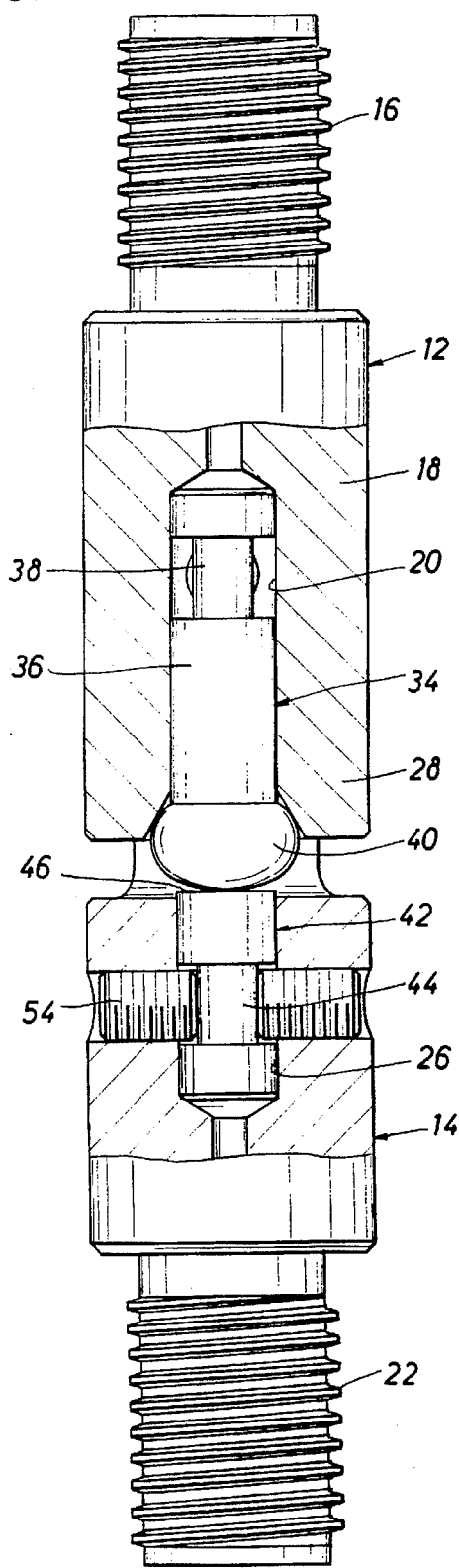
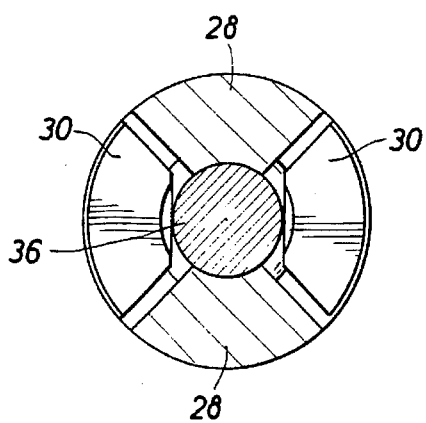
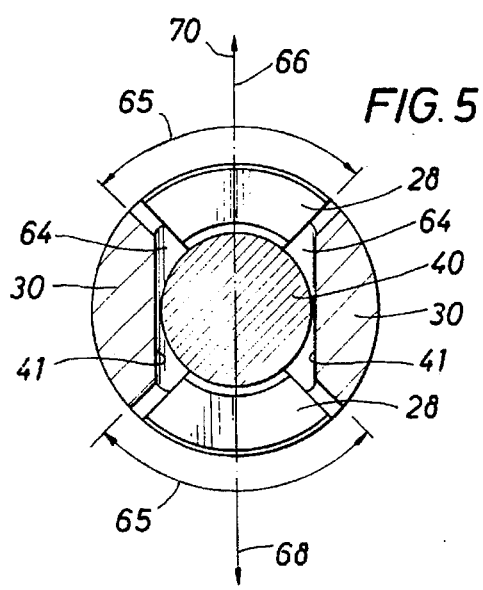
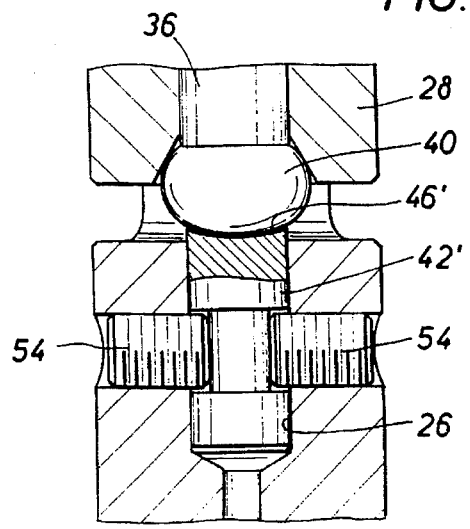
FIG. 3
FIG. 4
FIG. 5
FIG. 6

DRILL MOTOR COUPLING FOR MISALIGNED ROTATING SHAFTS

This is a continuation application Ser. No.08/237,068 filed on May 3, 1994, abandoned

BACKGROUND OF THE INVENTION

1. Field of the Invention

This invention relates to a coupling for engaging two rotary shafts. More particularly, this invention relates to a drill motor coupling for connecting two misaligned rotating shafts in an oil or gas well.

2. Description of the Prior Art

Downhole drill motors are more frequently used to drill oil and gas wells. Typically, such motors are driven by drilling mud which is forced down the drill string. Such drill motors connect with a drill bit by means of a rotary shaft. From time-to-time the drill bit may be misaligned with respect to the drill motor. Therefore, it is necessary at times to use one or more couplings in the shaft to accommodate the chances of misalignments. Additionally, such couplings need to accommodate compressive load while the drilling mud is moving downwardly and tensile loads during a reverse circulation.

The use of flexible motor couplings is well known. See, for example, U.S. Pat. Nos. 5,205,789 and 4,976,655. However, such designs are relatively complex to manufacture and can be difficult to assemble in the field. Consequently, there is a need for an improved design which can maximize manufacturing efficiencies, minimize cost and simplify field installations.

SUMMARY OF THE INVENTION

The present invention is directed to an improved coupling design for use with downhole motors and includes two primary elements or members each having engaging and interlocking legs. A pin is laterally inserted between the engaging legs of one element, inserted into the central bore of the other element and secured. Each primary element includes a threaded connection which is used to attach each element to an adjacent shaft member. The pin includes an enlarged spherical head at one end which engages a recessed region of the legs of the first element through which the pin is laterally inserted. Once assembled, the rotational forces of the first element are transferred to the second element through engaging legs.

BRIEF DESCRIPTION OF THE DRAWINGS

In order to more fully understand the drawings used in the detailed description of the present invention, a brief description of each drawing is provided, in which:

FIG. 3 is a cross-sectional elevational view taken along line 3—3 of FIG. 2;

FIG. 4 is a cross-sectional plan view taken along line 4—4 of FIG. 2;

FIG. 5 is a cross-sectional plan view taken along line 5–5 of FIG. 2; and

FIG. 6 is a detailed cross-sectional view of an alternate embodiment of the present invention.

DETAILED DESCRIPTION OF PREFERRED EMBODIMENT

Figure 1:
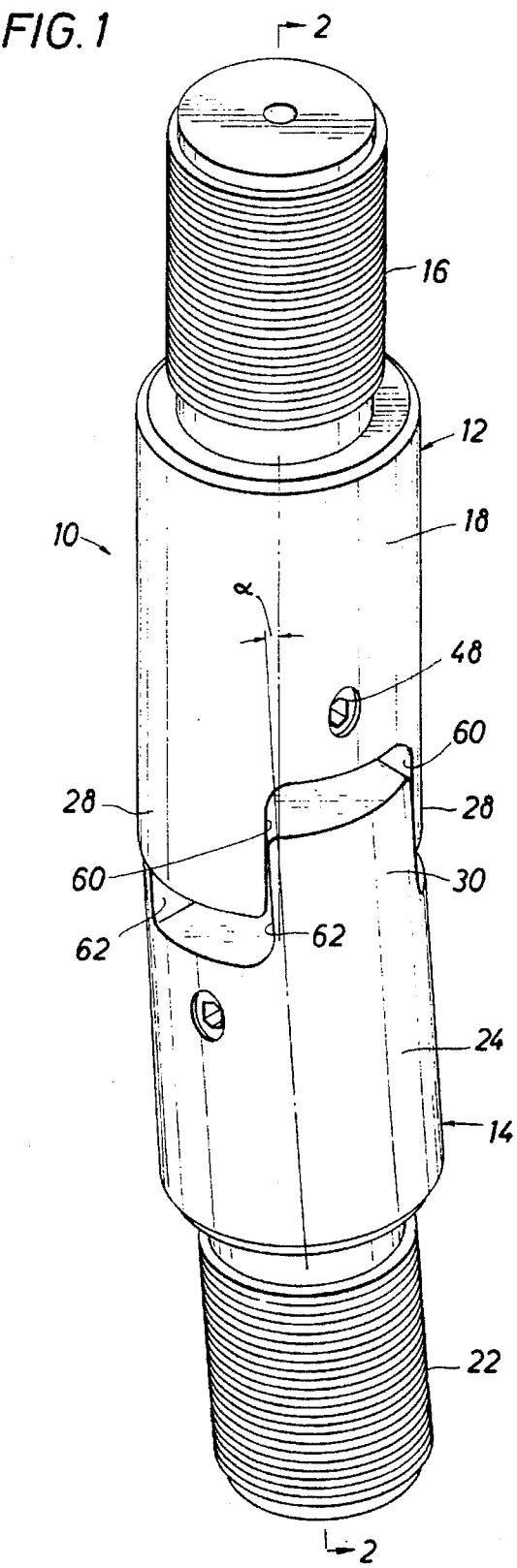
FIG. 1 is a perspective view of the present invention.
Figure 2:
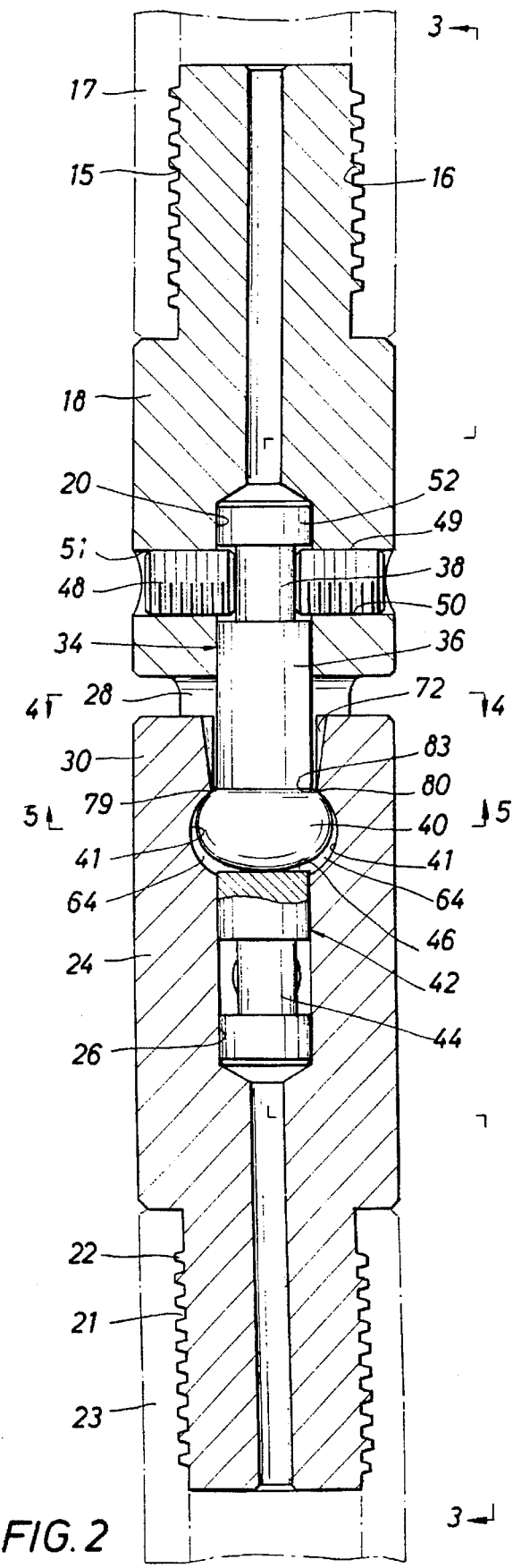
FIG. 2 is a cross-sectional elevational view taken along lines 2—2 of FIG. 1.

Referring to FIGS. 1–3, a flexible drill motor coupling 10 comprises a first element 12 and a second element 14. First element 12 includes a threaded end 16 adapted o engage threaded portions 15 of a rotating shaft 17. First element 12 also includes a body 18. A central bore 20 passes through body 18.

The second element 14 also includes a threaded end 22 adapted to engage threads 21 of rotating shaft 23. Second element 14 includes a body 24 through which a central bore 26 passes.

First element 12 includes two leg members 28 which descend downwardly as shown in FIG. 1 from body 18. Similarly, second element 14 includes two leg members 30 which project upwardly as shown in FIG 1 from body 24. Occasionally, body 18 having central bore 20 and leg members 28 may be referred to as the first coupler. Additionally, body 24 having central bore 26 with leg members 30 may be referred to as the second coupler.

Referring now to FIGS. 2 and 3, the present invention also includes a pin 34 having a central shaft portion 36, a recessed shaft portion 38 and an enlarged spherical head 40. The present invention includes a seat 42 having a recessed portion 44 and a top face 46, a portion of which is in contact with the tip of head 40 of pin 34 when assembled. As shown in FIG. 2, pin 34 is held in place by Allen screws 48 which include a threaded portion 49 engaging a corresponding threaded portion 50 in the bore 51 of body 18. The ends of screws 48 contact recessed shaft portion 38 of pin 34. In this manner, pin 34 is precluded from slipping out of body 18 due to enlarged shaft portion 52 of pin 34 which is above recessed shaft portion 38. Seat 42 is held in place within body 24 using similar Allen screws 54 (see FIG. 3). It is not necessary that screws 54 be used. Seat 42 will be held in place once assembled as described below; however, screws 54 will hold seat 42 in place until assembled.

Referring now to the FIGS. 3 through 5, the interrelationship of leg members 28 and leg members 30 will be described with respect to the insertion of pin 34. As noted above, first element 12 includes two leg members 28 which descend downwardly from body 18. Similarly, leg members 30 extend upwardly from body 24 of second element 14. Leg members 28 include radial surfaces 60 and leg members 30 include radial surfaces 62. Once fully assembled as shown in FIG. 1, radial surfaces 60 engage radial surfaces 62. In this manner, a torsional or rotational load may be transferred from first element 12 to second element 14 or vise versa. Pin 34 does not serve to transfer torsional load. Rather, it serves to provide tensile strength to keep first element 12 from separating from second element 14 and it provides for a pint compressive load transfer between first element 12 and second element 14.

Each leg member 30 includes a recessed curved wall 41 defining a recessed portion 64 which faces central bore 26. The size and curvature of recessed portion 64 is selected to permit the passage of head 40 through lateral openings 65 between leg members 30 as shown in FIG. 5. Curved wall 41 continues upwardly and terminates at a restricted top diameter 80 defined by edge 79. Diameter 80 is selected to prevent the passage of head 40 of pin 34 upwardly as shown in FIG. 2. Further, diameter 80 is selected preferably to enable the engagement of curved wall 41 near edge 79 with the base 83 of head 40 when a tensile load is placed on pin 34. In the assembly of the present invention, pin 34 is first laterally passed between leg members 30 in the direction of arrows 68 or 70 along an axis 66. Each leg member 30 also includes a slightly beveled surface 72 (see FIG. 2) which permits the angular rotation of pin 34 within recessed portion 64. In this manner, the first element may pivot relative to the second element to accommodate any misalignments in the longitudinal axes of shafts 17 and 23, as shown by the angle in FIG. 1. Preferably, face 46 of seat 42 is flat thereby providing a point contact between head 40 of pin 34 and top face 46 when a compressive load is applied. FIG. 4 is a cross-sectional view taken further up on the shaft 36 of pin 34. Generally, the difference in thickness of leg members 30 as shown in FIGS. 4 and 5 is the recessed portion 64.

The present invention is assembled as follows. First, seat 42 is inserted within central bore 26 of body 24. It is secured in place by Allen screws 54, if desirable and included. Next, head 40 of pin 34 is laterally inserted through lateral openings 65 between leg members 30 in the direction of arrows 68 or 70 as shown in FIG. 5. This is a significant departure from the embodiment proposed by U.S. Pat. No. 5,205,789 which does not teach or disclose the use of lateral insertion, rather it requires axial insertion of a thrust pin into a bore region of one member and then rotation of the pin within the member to engage a complex series of peripheral slots and jaws.

After pin 34 of the present invention has been laterally inserted within recessed region 64, body 18 is lowered over central shaft portion 36 of pin 34 until recessed shaft portion 38 is proximate bore 51 of body 18 thereby enabling the insertion of Allen screws 48. In this manner, pin 34 can be secured within body 18. When first element 12 is inserted over shaft 36, leg members 28 are positioned substantially normal to leg members 30 enabling engagement as shown in FIG. 1 and permitting radial surfaces 60 of legs 28 to engage radial surfaces 62 of legs 30.

In this manner, the present invention provides for the transfer of rotational forces through radial surfaces 60 and 62. Axial tensile load is taken by head 40 engaging recessed portion 64 near edge 79 and pin shaft portion 52 engaging Allen screws 48. As noted above and shown in FIG. 5, recessed portions 64 are sized in such a manner as to permit lateral insertion of head 40 of pin 34 along the direction of arrows 68 and 70 but pin 34 cannot be removed axially due to the size of head 40 and the restricted top diameter 80 of recessed portion 64 defined by edge 79. Any compressive load is also taken by pin 34. In that event the compressive load is transferred from body 18 through Allen screws 48 into shaft 36, down through head 40 and into face 46 of seat 42.

Referring now to FIG. 6, an alternate embodiment of seat 42' is shown wherein surface or top face 46' has a concave surface which generally matches the convex surface of spherical convex head 40. In this manner, a compressive load may be more evenly distributed across top face 46' of seat 42', and any slight angular movement to account for misalignment of shafts 17 and 23 as represented by angle α of FIG. 1 may be more easily accommodated for by a full surface engagement of spherical convex head 40 and top face 46'.

The foregoing disclosure and description of the invention is illustrative and explanatory thereof, and various changes in size, shape, and materials as well as the details of the illustrative construction and assembly, may be made without departing from the spirit and scope of the invention.

What is claimed is:

1. A shaft coupling for rotationally and axially connecting two members, the shaft coupling comprising:

a first coupler body having a first pair of legs and a first lateral opening extending between said first pair of legs, and said first coupler body having a longitudinal bore therein;

a second coupler body having a second pair of legs and a second lateral opening extending between said second pair of legs, said second coupler body having a central bore, said central bore having a shaft receiving portion and a head receiving portion;

a pin having a shaft portion and an enlarged, generally spherical head attached to said shaft portion, said spherical head fitting within said head receiving portion while prohibiting passage through said shaft receiving portion in any angular orientation of said head relative to said shaft receiving portion; and means for securing said shaft portion of said pin to said first coupler body, said securing means comprising:

said shaft portion having a peripheral recess near a first end of said shaft portion, said first coupler body having a threaded transverse bore extending to said longitudinal bore, and a screw threaded into said threaded transverse bore and extending into said peripheral recess.

2. The shaft coupling of claim 1, wherein said spherical head has a rounded, continuous surface and said rounded, continuous surface directly contacts said shaft portion.

3. A shaft coupling for rotationally and axially connecting a first shaft to a second shaft, the shaft coupling comprising:

a first element comprising:

a first coupler body having a circular cross-section and a longitudinal bore, said first coupler body having a first pair of legs and a first lateral opening extending between said first pair of legs;

a second element comprising:

a second coupler body having a circular cross-section and a central bore, said second coupler body having a second pair of legs and a second lateral opening extending between said second pair of legs;

a pin having a round shaft portion and a peripheral recess near a first end of said shaft portion, said pin having an enlarged, generally spherical head attached to a second end of said shaft portion;

means for securing said pin to said first element;

said central bore in said second coupler body having a shaft receiving portion and a head receiving portion, said spherical head of said pin being larger than said shaft receiving portion to prohibit passage of said spherical head through said shaft receiving portion in any angular orientation of said spherical head relative to said shaft receiving portion.

4. The shaft coupling of claim 3, wherein said spherical head has a rounded, continuous surface and said rounded, continuous surface directly contacts said shaft portion.

5. The shaft coupling of claim 4, wherein said head receiving portion includes a curved wall terminating at a pair of opposing edges defining a restricted top diameter, and said curved wall engages said rounded, continuous surface of said spherical head when an axial load is placed on said pin.

6. The shaft coupling of claim 3, wherein said means for securing comprises:

said first coupler body having a threaded transverse bore extending to said longitudinal bore; and a screw threaded into said threaded transverse bore and extending into said peripheral recess of said pin, wherein said shaft portion of said pin can be in any angular orientation along the longitudinal axis of said pin.

7. The shaft coupling of claim 3, further comprising a seat supported within said central bore of said second coupler body, said seat having a surface contacting said spherical head.

8. The shaft coupling of claim 7, wherein said seat surface is a concave surface adapted to matingly engage said spherical head.

9. The shaft coupling of claim 3, wherein said first pair of legs rests within said second lateral opening and said second pair of legs rests within said first lateral opening.

10. A shaft coupling for rotationally and axially connecting two members, the shaft coupling comprising:

a first coupler body having a first pair of legs and a first lateral opening extending between said first pair of legs, and said first coupler body having a longitudinal bore therein;

a second coupler body having a second pair of legs and a second lateral opening extending between said second pair of legs, said second coupler body having a central bore, said central bore having a shaft receiving portion and a head receiving portion;

a pin having a shaft portion and an enlarged, generally spherical head attached to said shaft portion, said spherical head fitting within said head receiving portion while prohibiting passage through said shaft receiving portion in any angular orientation; and means for securing said shaft portion of said pin to said first coupler body, wherein said second lateral opening is larger than said spherical head to permit said spherical head to pass laterally through said second lateral opening into said head receiving portion.

11. The shaft coupling of claim 10, wherein said spherical head has a rounded, continuous surface and said rounded, continuous surface is attached to said shaft portion.

12. The shaft coupling of claim 11, wherein said head receiving portion includes a curved wall terminating at a pair of opposing edges defining a restricted top diameter, and said curved wall engages said rounded, continuous surface of said spherical head when an axial load is placed on said pin.

13. The shaft coupling of claim 10, wherein said means for securing comprises:

said shaft portion having a peripheral recess near a first end of said shaft portion;

said first coupler body having a threaded transverse bore extending to said longitudinal bore; and a screw threaded into said threaded transverse bore and extending into said peripheral recess.

14. The shaft coupling of claim 13, wherein said spherical head has a rounded, continuous surface and said rounded, continuous surface is attached to said shaft portion.

15. The shaft coupling of claim 10, further comprising a seat supported within said central bore of said second coupler body, said seat having a surface contacting said spherical head.

16. The shaft coupling of claim 15, wherein said seat surface is a concave surface adapted to matingly engage said spherical head.

17. The shaft coupling of claim 10, wherein said second pair of legs are opposite one another and each of said legs include an inner arcuate surface.

18. The shaft coupling of claim 10, wherein said first pair of legs rests within said second lateral opening and said second pair of legs rests within said first lateral opening.

19. A shaft coupling for rotationally and axially connecting a first shaft to a second shaft, the shaft coupling comprising:

a first element comprising:

a first coupler body have a circular cross-section and a longitudinal bore, said first coupler body having a first pair of legs and a first laternal opening extending between said first pair of legs;

a second element comprising:

a second coupler body having a circular cross-section and a central bore, said second coupler body having a second pair of legs and a second lateral opening extending between said second pair of legs;

a pin having a round shaft portion and a peripheral recess near a first end of said shaft portion, said pin having an enlarged, generally spherical head attach to a second end of said shaft portion;

means for securing said pin to said first element;

said central bore in said second coupler body having a shaft receiving portion and a head receiving portion, said spherical head of said pin being larger than said shaft receiving portion to prohibit passage of said spherical head through said shaft receiving portion in any angular orientation of said spherical head, wherein said second lateral opening is larger than said spherical head to permit said spherical head to pass laterally through said second lateral opening into said head receiving portion.

* * * * *